June 17, 1941.  R. H. DANHAUS  2,245,574
VARIABLE TRACK WHEEL CONSTRUCTION
Filed Nov. 22, 1937
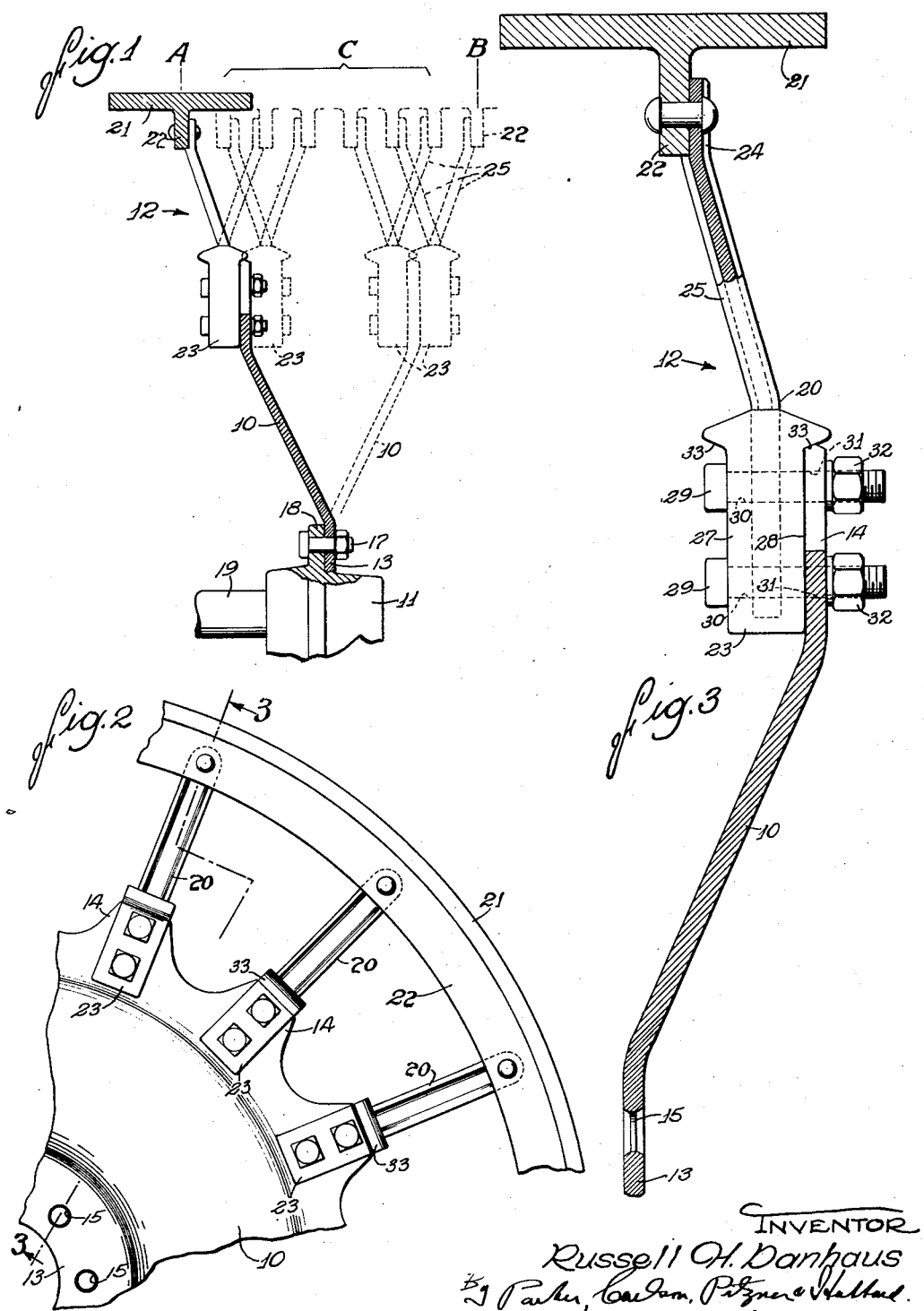
INVENTOR
Russell H. Danhaus
ATTORNEYS Patented June 17, 1941

2,245,574

UNITED STATES PATENT OFFICE 2,245,574

VARIABLE TRACK WHEEL CONSTRUCTION

Russell H. Danhaus, Quincy, Ill., assignor to Electric Wheel Co., Quincy, Ill., a corporation of Illinois Application November 22, 1937, Serial No. 175,746

4 Claims. (Cl. 301—9)

This invention relates to wheel construction and more particularly concerns an improved variable-track wheel equipped with a tire or a metal traction rim for use in agricultural tractors and the like.

One object of the present invention is to provide a variable-track wheel structure formed in sections adapted to be arranged in a multiplicity of different combinations so as to produce a large number of wheel spacings or track variations in each of which the composite sectional structure forms a rigid durable unit which may be easily and simply rearranged to provide any of the other track variations.

Another object is to provide a novel wheel construction of this character in which a metallic traction rim is detachably mounted upon a rotatable wheel body in a manner permitting the rim to be located selectively in various track positions longitudinally of the wheel axis merely by detaching and replacing the same in different predetermined relationships to said body.

Other objects and advantages will become apparent in the following description and from the accompanying drawing in which:

Figure 1 is an elevational view partially in axial section and partially diagrammatic showing a preferred embodiment of the invention.

Fig. 2 is a fragmentary face elevational view of the wheel.

Fig. 3 is a sectional view taken substantially along line 3—3 of Fig. 2 and shown on a larger scale.

While the invention is susceptible of various modifications and alternative constructions, I have shown in the drawing and will herein describe in detail, a preferred embodiment, but it is to be understood that I do not thereby intend to limit the invention to the specific form disclosed, but intend to cover all modifications and alternative constructions falling within the spirit and scope of the invention as expressed in the appended claims.

According to the principal aim of the invention, the improved wheel structure is, in its preferred embodiment, composed of two major sections, namely, an inner or body section adapted to be secured in either of two different positions on a hub and an outer or rim section adapted to be mounted in any of four different positions relative to the body section, the various combinations providing eight different positions spaced longitudinally of the wheel axis.

In the following detailed description, the invention will be referred to by way of example as embodied in a tractor wheel assembly including a body section 10 mounted upon a hub 11, and a tread element or traction rim section 12 of greater overall diameter than the body section and constructed to be detachably connected thereto in a plurality of relative positions.

The body section 10 is preferably constructed as a bowed or frusto-conical metal disk having a flattened central portion 13 offset relative to the circumferential margin of the disk, which herein provides a flat plane flange 14. The central portion 13 is suitably axially apertured to receive the hub 11 and has a circular series of smaller apertures 15 through which the shanks of bolts 17 are passed to secure either face of the central portion selectively against the outer or engagement face of a radial connecting flange 18 upon the hub (Fig. 1). Through this arrangement the hub 11 may be permanently connected rotatably to a tractor axle 19 and the wheel may be selectively mounted in either of two extreme or major track variations, as indicated at A and B in Fig. 1, simply by reversing the body section 10 upon the hub.

For the purpose of attaining additional track variations intermediate the extremes A and B, the rim section 12 is adapted to be mounted shiftably and reversibly upon the peripheral flange 14 of the body section 10. If desired the rim section may be constructed with the disk body shaped somewhat like the disk of the body section 10. In the present instance, however, the rim section comprises a plurality of spokes 20 and a metallic traction rim 21 having an inner radial connecting flange 22. Each spoke 20 is provided with an elongated base 23 and an offset, shouldered end portion 24 maintained in parallel planes by a diagonal body shank 25. The shouldered end portions 24 of the spokes are suitably secured to the connecting flange 22 of the traction rim as by riveting or the like so that the rim serves to connect the spokes at their outer ends (Fig. 2).

The base 23 of each spoke is fashioned to engage interchangeably with either side of the peripheral flange 14 of the disk, and to be reversibly connected to the selected side of the flange. For this purpose identical, opposite, longitudinal engagement faces 27 and 28 are formed upon the base 23 in parallel planes which intersect the axis of the shank 25, the face 27 being on the inside of the angle between the base and shank. A pair of suitable attaching bolts 29 passes through spaced apertures 30 which intersect the engagement faces 27 and 28 of the base, and the shanks of the bolts enter corresponding apertures 31 in the flange 14, and are fastened tight by means of readily detachable conventional nuts 32.

Shearing strain upon the bolts 29 is relieved by thrust shoulders 33 which are formed at the inner end of each of the engagement faces 27 and 28 of the base 23 for engagement with the outer edge of the flange 14. Preferably, the thrust shoulders 33 and the edge of the connecting flange 14 are complementally biased substantially as shown and are so related that they will be drawn up tight as an incident to securing the bolts 29.

As a result of the novel construction of the spoke base 23, the spoke may be shifted interchangeably to either side of the flange 14 and in either such location may be secured in place reversibly. Because of the diagonal relationship of the shank 25 of the spoke to the base 23 and to the axis of the wheel, the traction rim 22 can be located in four track positions corresponding to the four possible positions of the base 23 relative to the flange 14. Thus, in each of the two positions of the flange 14 attained by reversal of the body section 10 upon the hub 11, the traction rim 22 may be located in four selective track positions. Therefore, as shown in Fig. 1, besides the two extreme track positions A and B, there are six additional track positions designated C, in which the traction rim 22 may be located selectively by appropriate attachment of the spokes 20, making a total of eight track positions longitudinally of the wheel axis.

It may be stated that in practice a uniform spacing of two inches between the centers of several selective track positions may be attained in a tractor wheel of fifty-five inches tread diameter by having the spoke shanks 25 at such a diagonal angle that the circumferential median plane of the traction rim 22 will be offset three inches from the circumferential median plane of the peripheral connecting rim 14 of the body section 10 when the engagement face 28 of the spoke base is in abutment with the flange 14. Thus, in a pair of axially alined wheels constructed in accordance with the invention it is possible to attain eight principal four-inch track variations. Such variations may, for example, be from an extreme, narrow wheel spacing of fifty-six inches on centers to an extreme, wide spacing of eighty-four inches on centers.

It is therefore apparent that one of the major advantages of the present invention resides in the increased number of track variations attainable thereby over prior wheel constructions.

Other substantial advantages reside in the total elimination of all spare or substitute parts and the ease and simplicity with which all of the large number of track variations can be attained simply by reversing the body section upon the hub and by reversing or changing the rim section upon the body section, the parts when connected forming a strong, durable, rigid unit.

I claim as my invention:

1. A wheel construction of the character described comprising, in combination, a hub, a wheel body reversibly connected to said hub, a traction rim of substantially greater diameter than said body, and a plurality of radial spokes connected to said rim having the opposite ends thereof relatively offset in a direction axially of the wheel and adapted for connecting said rim to said body in a plurality of different selective track positions in each position of said body upon said hub.

2. A variable track wheel construction including, in combination, a hub having a radially extending flange, a body member comprising a metal disk axially apertured to receive said hub and having the central portion thereof about the hub aperture constructed to be reversibly attached to said radially extending flange, an outer peripheral portion on said disk offset relative to said central portion in a direction longitudinally of the wheel axis, a rim of substantially greater diameter than said disk, inwardly extending spokes on said rim including attachment bases offset to one side of the circumferential median plane of said rim, said attachment bases being interchangeably and reversibly engageable with the opposite faces of said outer peripheral portion of the disk, and means for removably connecting said attachment bases to said outer peripheral portion.

3. A variable track wheel construction comprising, in combination, a hub, a wheel body reversibly connected to said hub and having its outer peripheral portion offset in a direction longitudinally of the wheel axis so that by reversal of the wheel body said peripheral portion may be placed in either of two selected spaced extreme track positions, a traction rim of substantially greater diameter than said wheel body, and means including a plurality of spokes extending generally radially between said rim and the outer peripheral portion of the wheel body, said spokes including inner and outer portions relatively offset in a direction longitudinally of the wheel axis, the outer portions of said spokes being fastened to the rim and the inner portions of said spokes being adapted to be secured upon either side of the outer peripheral portion of the wheel body and being reversible on each of said sides, whereby in each of the extreme track positions of said wheel body a plurality of spaced track positions of said rim can be obtained by interchanging or reversing said inner portions of said spokes upon said outer peripheral portion of the wheel body.

4. A wheel construction of the character described comprising, in combination, a wheel body including a peripheral portion having opposite engagement faces, a rim of greater diameter than said body, means for connecting said rim to said body including a plurality of spokes each including a base having opposite sides to engage the faces of said peripheral portion interchangeably and reversibly, said base having a thrust shoulder adjacent the top of each side thereof to abut the outer edge of said peripheral portion, and means for removably securing said base to the selected one of said faces, said outer edge being oppositely biased respectively toward each of said engagement faces and said shoulders being respectively biased complementary to said edge so that the action of said securing means in forcing any selected side of said base against either selected one of said engagement faces will be effective to draw the corresponding shoulder up tightly with said outer edge.

RUSSELL H. DANHAUS.